US006719872B2

(12) United States Patent
Tomita et al.

(10) Patent No.: US 6,719,872 B2
(45) Date of Patent: Apr. 13, 2004

(54) HOT MELT COMPOSITION AND METHOD OF ASSEMBLING MEMBERS USING THE SAME

(75) Inventors: Atsushi Tomita, Nishikasugai-gun (JP); Yuji Iwatsuka, Nishikasugai-gun (JP)

(73) Assignee: Aica Kogyo Co., Ltd., Aichi-Ken (JP)

( * ) Notice: Subject to any disclaimer, the term of this patent is extended or adjusted under 35 U.S.C. 154(b) by 0 days.

(21) Appl. No.: 09/888,344

(22) Filed: Jun. 22, 2001

(65) Prior Publication Data

US 2002/0061966 A1 May 23, 2002

(30) Foreign Application Priority Data

Sep. 28, 2000 (JP) ........................................ 2000-295339

(51) Int. Cl.$^7$ ..................... C09J 153/00; C09J 171/12
(52) U.S. Cl. ..................... 156/334; 525/920; 524/505
(58) Field of Search ........................ 156/334; 525/920; 524/505

(56) References Cited

U.S. PATENT DOCUMENTS 4,104,323 A   8/1978   Hansen
4,314,926 A   2/1982   Allison, III
4,360,568 A   11/1982  Allison, III

FOREIGN PATENT DOCUMENTS

| WO | WO-90/14396 A1 | 11/1990 |
| WO | WO-97/35920 A1 | 10/1997 |
| WO | WO-00/24840 A1 | 5/2000 |

*Primary Examiner*—Patricia A. Short
(74) *Attorney, Agent, or Firm*—Davis & Bujold, PLLC

(57) ABSTRACT

A hot melt composition containing, as essential ingredients, a specific high-molecular weight styrene block copolymer, a specific polyphenylene ether resin and a viscosity adjuster. The hot melt composition permits an easy assembling and sealing between a plurality of members. More particularly, it is possible for the hot melt composition to be melted and applied to one member in advance of the assembling work, such that the one member with the hot melt composition already applied thereto can be carried into a work site or a work line and simply joined to another member at those places. Further advantageously, the members joined or assembled via the hot melt composition can be disassembled without difficulty, which enables recycling of the used members.

10 Claims, No Drawings

HOT MELT COMPOSITION AND METHOD OF ASSEMBLING MEMBERS USING THE SAME

FIELD OF THE INVENTION

The present invention relates to a hot melt composition suitably used for sealing a part where sealing is required, for which reactive curing sealing materials, such as a silicone, polyurethane, and polysulfide sealants; a butyl rubber sealant; a molded packing made from natural rubber or synthetic rubber; and the like are conventionally used, and to a method of assembling members using the hot melt composition.

BACKGROUND OF THE INVENTION

Conventionally, in each industrial field, such as an electrical, automobile, and construction industries, various kinds of sealing materials have been used to seal various parts for the purpose of dust control and waterproofing.

Recently, such sealing for dust control and waterproofing is required in more and more fields. In recent houses, for example, it is desired that airtightness and adiathermancy should be improved to enhance heat efficiency, and for this purpose, housing members used to build a house are also required to be highly airtight. In order to comply with such requirements, for the time being, a sealing part, where sealing is required, is treated by means of a cartridge filled with a reactive curing sealing material, such as a silicone, polyurethane, butyl rubber, and polysulfide sealants, or the like. In this case, the filling of the cartridge and application of the sealing material to the sealing part are performed within a factory or at a construction site at the time of or after the assembling work for members. Instead of such sealing by means of a cartridge, attachment of a molded packing made from natural rubber or synthetic rubber to the sealing part may be performed, also within a factory or at a construction site at the time two or more members are assembled. Otherwise, a butyl or styrene rubber hot melt adhesive may be applied to the sealing part within a factory.

However, there are some problems with such conventional sealing materials. In order to obtain a desired performance of the reactive curing sealing material applied with the cartridge or the like, it is necessary for the sealing material to be kept still for a long time until it has been reactively solidified, which is nonproductive. Also, the reactive curing sealing material has a problem with its peelability. For, once it is applied and solidified, it is no easy to peel it off. Consequently, the members once assembled with the reactive curing sealing material are difficult to be disassembled after use or at the time any inconvenience arises.

Furthermore, it is impossible for the reactive curing sealing material to be applied beforehand, and it must be applied at the time of or after the assembling work for the members.

As to the molded packing made from natural or synthetic rubber, there is no problem with its peelability or detachability. However, the molded packing has other problems. For example, in order to mold each packing, expensive dies having a shape conforming to the shape of each packing are required. Also, the molded packing has a high compression set if used at a temperature between 60° C. and 80° C., and it is thus difficult to maintain good airtightness for a long period of time with such a molded packing. Furthermore, the automated attachment of the molded packing is difficult and, therefore, each packing is usually attached by hand, which is very burdensome and nonproductive.

A hot melt adhesive made from a thermoplastic rubber, such as butyl or styrene rubber, can be used as an adhesive seal for joining various kinds of airtight members. In this case, the airtight members can be processed or assembled within a short period of time after the hot melt adhesive, which can be applied directly to those members, is cooled, which results in high productivity. Nevertheless, such a hot melt adhesive also has defects. For example, the hot melt adhesive is not easy to peel off, and once two or more members are assembled with the hot melt adhesive, it is difficult to disassemble them. Also, the hot melt adhesive has a high compression set at a high temperature, as with the molded packing as mentioned above.

SUMMARY OF THE INVENTION

The present invention provides a hot melt composition having a compression set of 90% or less at a temperature between 60° C. and 80° C., which temperature is disadvantageous to conventional hot melt-type sealing materials, when measured by a measuring method in accordance with provisions of JISK6262, the hot melt composition being capable of maintaining its sealing property as well as being easily detachable after use or at the time any inconvenience arises. The present invention also provides a method of assembling members using the hot melt composition, in which the hot melt composition is previously applied to a member, thereby skipping such an application work at the time of or after the assembling work of the members, which results in streamlining of work processes and shortening of work periods.

When a conventional styrene block copolymer having a number average molecular weight (Mn) of less than 100,000 was employed as a base ingredient to compound a hot melt composition, a tackifying resin with a high softening point was blended such that the hot melt composition was provided with heat resistance. Also, the amount of a softener, which provides flexibility, was reduced.

However, the hot melt composition produced in this manner was poor in flexibility at a low temperature, while it was deformed or cracked because of a stress applied to a sealed portion and, therefore, not capable of maintaining its sealing property at a high temperature.

Also, when a styrene block copolymer having a number average molecular weight (Mn) of 100,000 or more was employed as a base ingredient to compound a hot melt composition, a desired heat resistance to the temperature of 80° C. for 5 days was not achieved, unless a polyphenylene ether resin or a modified polyphenylene ether resin was added thereto.

Furthermore, if an increased amount of softener was blended to enhance flexibility at a low temperature, the compression set of the composition became high, especially, at a temperature between 60° C. and 80° C., and once the hot melt composition was exposed to such a high temperature, it was never recovered and the sealing property thereof was thus lost.

In view of these facts, one object of the present invention is to provide a hot melt composition of which the compression set, as a measurement of compression recovery after exposed to a high temperature between 60° C. and 80° C., is kept to be 90% or less, if measured by a measuring method in accordance with provisions of JISK6262. Such a hot melt composition should not reduce its flexibility at a low temperature. Also, such a hot melt composition should be capable of maintaining its sealing property and able to be peeled off without difficulty. The other object of the present invention is to provide a method of assembling members using the hot melt composition.

In order to attain these objects, there is provided a hot melt composition comprising, as essential ingredients, a high-molecular weight styrene block copolymer having a number average molecular weight (Mn) of 100,000 or more, either of a polyphenylene ether resin and a modified polyphenylene ether resin, and a viscosity adjuster. Also, there is provided a method of assembling members using the hot melt composition, the method characterized in that the molten matter of the hot melt composition is previously applied directly to a member which requires sealing.

For the high-molecular weight styrene block copolymer as an essential ingredient of the invention, a styrene-isoprene-styrene (SIS) block copolymer; a styrene-butadiene-styrene (SBS) block copolymer; a styrene-ethylene-1-butene-styrene (SEBS) block copolymer; a styrene-ethylene-propylene-styrene (SEPS) block copolymer; poly(alpha-methyl-styrene)-polybutadiene-poly(alpha-methyl-styrene), poly(alpha-methyl-styrene)-polyisoprene-poly(alpha-methyl-styrene), and their hydrogenated modifications, such as poly(alpha-methyl-styrene)-poly(ethylene-1-butene)-poly(alpha-methyl-styrene) and poly(alpha-methyl-styrene)-poly(ethylene-propylene)-poly(alpha-methyl-styrene), are useable. Commercially available are, for example, Kraton G1650 from Shell Chemical Company and Septon 2043 from Kuraray Co., Ltd.

The compounding ratio of the styrene block copolymer is properly selectable in the range of from 3 to 50 parts by weight relative to the entire composition (being regarded as 100 parts by weight here and below). If the compounding ratio thereof is less than 3 parts by weight, the composition has a high compression set since cohesion is lowered. On the contrary, if the compounding ratio of the styrene block copolymer is more than 50 parts by weight, the composition is hardened and flexibility is thus lost. Also, in the latter case, the hot melt composition loses its flowability and, consequently, it can not be applied with a hot melt applicator in common use.

For the polyphenylene ether resin, known ones can be employed. For example, poly(2,6-dimethyl-1,4-phenylene ether), poly(2-methyl-6-ethyle-1,4-phenylene ether), poly(2,6-diphenyl-1,4-phenylene ether), poly(2-methyl-6-phenylene-1,4-phenylene ether), and poly(2,6-dichloro-1,4-phenylene ether) are useable. Also, a polyphenylene ether copolymer, such as a copolymer derived from 2,6-xylenol and monovalent phenols, is useable as well. The modified polyphenylene ether resin can be prepared by blending the foregoing polyphenylene ether resin with a styrene resin, a nylon resin, or the like. When blended with the styrene resin or the nylon resin, the polyphenylene ether resin is improved in workability. As such a modified polyphenylene ether resin, Xyron 500H from Asahi Chemical Industry Co., Ltd. is commercially available.

The purposes of adding the polyphenylene ether resin or the modified polyphenylene ether resin to the styrene block copolymer are as follows. The polyphenylene ether resin and the modified polyphenylene ether resin, which are both non-adhesive, have compatibility with a styrene phase of the styrene block copolymer. Therefore, by adding the polyphenylene ether resin or the modified polyphenylene ether resin to the styrene block copolymer, wettability of the styrene phase relative to an adherend is lowered at a high temperature, which results in enhancement of peelability of the resulting composition. Also, if a temperature at which the styrene phase is softened is risen, heat resistance is improved because such temperature influences the heat resistance of the styrene block copolymer. Accordingly, if a thermal deformation temperature or glass transition temperature of the polyphenylene ether resin or the modified polyphenylene ether resin added to the styrene block copolymer is higher than a glass transition temperature of styrene, which is from 90° C. to 100° C., the resulting composition is provided with a desired heat resistance.

However, in order to achieve an goal of the invention, that is, a heat resistance to the temperature of 80° C., by adding a small amount of such polyphenylene ether resin, it is preferable to employ a polyphenylene ether resin or a modified polyphenylene ether resin having a thermal deformation temperature of 120° C. or above. Furthermore, when a heat resistance to a temperature higher than 80° C. is required, it is preferable to employ a polyphenylene ether resin or a modified polyphenylene ether resin having a thermal deformation temperature of 150° C. or above, such that a desired peelability as well as a desired heat resistance can be achieved easily by addition of a small amount of either resin. The polyphenylene ether resins and modified polyphenylene ether resins having a thermal deformation temperature of 120 ° C. or above are relatively easily available on the market.

The compounding ratio of the polyphenylene ether resin or the modified polyphenylene ether resin is properly selectable in the range of from 0.5 to 30 parts by weight relative to the entire composition. If the compounding ratio thereof is less than 0.5 part by weight, the desired heat resistance can not be achieved even if the thermal deformation temperature or the glass transition temperature of the added resin is above 180° C. In addition, the peelability of the composition from each member is markedly deteriorated. On the contrary, if the compounding ratio thereof is more than 30 parts by weight, the composition is hardened and flexibility is thus lost.

For the viscosity adjuster, the low-molecular weight matter, such as atactic polyolefine, polybutene, isobutylene, paraffinic oil or naphthenic oil, is useable individually or mixedly to lower melt viscosity of the composition. Commercially available are, for example, UT2304, from Ube Rekisen K. K., as an atactic polyolefine and Kristol 70, from Esso Sekiyu K. K., as an paraffinic oil.

The compounding ratio of the viscosity adjuster is properly selectable in the range of from 5 to 90 parts by weight relative to the entire composition. If the compounding ratio thereof is less than 5 parts by weight, the composition is hardened and flexibility is thus lost. On the contrary, if the compounding ratio thereof is more than 90 parts by weight, the composition has a high compression set since cohesion is lowered.

In addition to the foregoing essential ingredients, styrene block copolymers having a number average molecular weight (Mn) of less than 100,000, for example, a styrene-isoprene-styrene (SIS) block copolymer; a styrene-butadiene-styrene (SBS) block copolymer; a styrene-ethylene-1-butene-styrene (SEBS) block copolymer; a styrene-ethylene-propylene-styrene (SEPS) block copolymer; poly(alpha-methyl-styrene)-polybutadiene-poly(alpha-methyl-styrene), poly(alpha-methyl-styrene)-polyisoprene-poly(alpha-methyl-styrene), and their hydrogenated modifications, such as poly(alpha-methyl-styrene)-poly(ethylene-1-butene)-poly(alpha-methyl-styrene) and poly(alpha-methyl-styrene)-poly(ethylene-propylene)-poly(alpha-methyl-styrene); and thermoplastic elastomer, such as butyl synthetic rubber, ethylene-propylene rubber, acrylic rubber, polyester elastomer, ethylene-vinyl acetate copolymer, ionomer resin, ethylene-acrylic acid copolymer, polyamide resin and the like, may be blended individually or mixedly according to need.

Further in addition to the above, a known denaturant, such as a tackifier, filler and the like, may be mixed if necessary. For the tackifier, terpene resin, terpene phenol resin, rosin, hydrogenated rosin resin, petroleum resin and/or hydrogenated petroleum resin may be used individually or mixedly. For the filler, any filler generally used for coating or adhesive material, for example, talc, clay, silica, calcium carbonate or titanium oxide, may be used. Furthermore, olefinic wax or paraffinic wax may be properly added for adjustment of viscosity of the resulting hot melt composition.

The hot melt composition as a sealing compound of the invention can be produced by mixing and kneading all or any of the aforementioned components using a Banbury-type mixer, a heating kneader, a two-axis extruder, or the like.

The hot melt composition of the invention is applicable, for example, in the field of housing. Specifically, engagement parts of interior or exterior panels; joints thereof; attachment parts of window sashes to exterior wall panels, wall sockets for general lighting or interior illumination, ventilating openings and door stops; and engagement parts of flooring materials are the parts where high airtightness is required in a house. To these parts, a hot melt-type elastic sealing material, that is, the hot melt composition compounded in the aforementioned manner is suitably applied with a multi-purpose hot melt applicator. Specifically, the hot melt composition is melted and previously applied to one of two members to be assembled, and then cooled and solidified in a short period of time. The member to which the hot melt composition is previously applied is joined to or assembled with the other member at a construction site or within a factory during a subsequent process. A sealing effect of the hot melt composition is thereby achieved. In this case, the assembling work at the construction site or during the subsequent process may be performed either before or after the hot melt composition applied to the member is cooled to ambient temperature. As a result, the hot melt composition of the invention is applicable to various work processes.

As other examples of application, the hot melt composition of the invention can be used in the assembly of various kinds of electronic or electric parts, various kinds of automotive or rolling stock parts, and various kinds of parts for furniture or fittings.

The hot melt applicator for applying the hot melt composition to members may be of a handgun type, block melt type, bulk melt type, or foam melt type. Commercially available are, for example, a bulk melter BM-505 and a foam melt applicator FM-151, both from Nordson Company.

For the purpose of mass-production within a factory, a head portion of the hot melt applicator may be fixed to an industrial robot or the like. In this manner, speedy application of the hot melt composition is made possible even to the members of complicated shapes, which results in an outstanding improvement in production efficiency.

The styrene block copolymer is not cross-linked as it is, and has rubber elasticity as well as thermal plasticity and, therefore, it can be easily molded. However, a low-molecular weight styrene block copolymer, having a number average molecular weight (Mn) of less than 100,000, is deformed and never recovered once it is subjected to a compressive stress under a temperature between 60° C. and 80° C. For this reason, a high-molecular weight styrene block copolymer, having a number average molecular weight (Mn) of 100,000 or more, is employed. Furthermore, by mixing it with a heat-resisting polyphenylene ether resin or modified polyphenylene ether resin, which is voluntarily compatible with a styrene phase of the styrene block copolymer, deformation of the resulting composition is prevented even when the compressive stress is applied thereto under such a high temperature. In this case, the compression set, which is a measurement of compression recovery, of the hot melt composition is kept to be 90% or less, and the sealing property of the hot melt composition is thus maintained.

DETAILED DESCRIPTION OF THE INVENTION

The invention will now be described more in detail by way of example, although the invention is not restricted to the following examples. In the following examples, all parts are parts by weight unless specifically identified otherwise.

EXAMPLE 1

As an SEBS block copolymer having a number average molecular weight (Mn) of 100,000 or more, 3 parts of Kraton G1650, manufactured by Shell Chemical Company, was employed. As an SEBS block copolymer having a number average molecular weight (Mn) of less than 100,000, 20 parts of Kraton G1657, manufactured by Shell Chemical Company, was employed. As a modified polyphenylene ether resin, 30 parts of Xyron 500H, manufactured by Asahi Chemical Industry Co., Ltd., having a thermal deformation temperature of 120° C. was employed. As a viscosity adjuster, 15 parts of Kristol 70, which is a paraffinic oil manufactured by Esso Sekiyu K. K., was employed. As a tackifier, 32 parts of Arkon P125, which is a hydrogenated petroleum resin, was employed. All of these components were mixed up and heated with a sigma-type kneader, and a resulting composition was used as a hot melt composition according to Example 1.

EXAMPLE 2

As an SEBS block copolymer having a number average molecular weight (Mn) of 100,000 or more, 50 parts of Kraton G1650, manufactured by Shell Chemical Company, was employed. As a modified polyphenylene ether resin, 5 parts of Xyron 500H, manufactured by Asahi Chemical Industry Co., Ltd., having a thermal deformation temperature of 120° C. was employed. As a viscosity adjuster, 45 parts of UT2304, which is an atactic polyolefine manufactured by Ube Rekisen K. K., was employed. All of these components were mixed up and heated with a sigma-type kneader, and a resulting composition was used as a hot melt composition according to Example 2.

EXAMPLE 3

As an SEBS block copolymer having a number average molecular weight (Mn) of 100,000 or more, 9.5 parts of Kraton G1650, manufactured by Shell Chemical Company, was employed. As a modified polyphenylene ether resin, 0.5 part of Xyron 500H, manufactured by Asahi Chemical Industry Co., Ltd., having a thermal deformation temperature of 120° C. was employed. As a viscosity adjuster, 90 parts of Kristol 70, which is a paraffinic oil manufactured by Esso Sekiyu K. K., was employed. All of these components were mixed up and heated with a sigma-type kneader, and a resulting composition was used as a hot melt composition according to Example 3.

EXAMPLE 4

As an SEBS block copolymer having a number average molecular weight (Mn) of 100,000 or more, 7 parts of Kraton G1650, manufactured by Shell Chemical Company, was employed. As an SEBS block copolymer having a number average molecular weight (Mn) of less than 100,000, 20 parts of Kraton G1657, manufactured by Shell Chemical Company, was employed. As a modified polyphenylene ether resin, 10 parts of Xyron 500H, manufactured by Asahi Chemical Industry Co., Ltd., having a thermal deformation temperature of 120° C. was employed. As a viscosity adjuster, 5 parts of Kristol 70, which is a paraffinic oil manufactured by Esso Sekiyu K. K., was employed. As a tackifier, 58 parts of Arkon P125, which is a hydrogenated petroleum resin, was employed. All of these components were mixed up and heated with a sigma-type kneader, and a resulting composition was used as a hot melt composition according to Example 4.

Comparative Example 1

In accordance with Example 1, 2 parts of Kraton G1650, 23 parts of Kraton G1657, 32 parts of Xyron 500H, 15 parts of Kristol 70, and 28 parts of Arkon P125 were mixed up and heated with a sigma-type kneader, and a resulting composition was used as a hot melt composition according to Comparative Example 1.

Comparative Example 2

In accordance with Examples 1 and 2, 40 parts of Kraton G1650, 0.2 part of Xyron 500H, 55 parts of Ubetac UT2304, and 4.8 parts of Arkon P125 were mixed up and heated with a sigma-type kneader, and a resulting composition was used as a hot melt composition according to Comparative Example 2.

Comparative Example 3

In accordance with Example 2, 55 parts of Kraton G1650, 5 parts of Xyron 500H, and 40 parts of Ubetac UT2304 were mixed up and heated with a sigma-type kneader, and a resulting composition was used as a hot melt composition according to Comparative Example 3.

Comparative Example 4

In accordance with Example 3, 4 parts of Kraton G1650, 1 part of Xyron 500H, and 95 parts of Kristol 70 were mixed up and heated with a sigma-type kneader, and a resulting composition was used as a hot melt composition according to Comparative Example 4.

Comparative Example 5

In accordance with Example 1, 5 parts of Kraton G1650, 20 parts of Kraton G1657, 10 parts of Xyron 500H, 3 parts of Kristol 70, and 62 parts of Arkon P125 were mixed up and heated with a sigma-type kneader, and a resulting composition was used as a hot melt composition according to Comparative Example 5.

Comparative Example 6

An EPDM rubber, commercially available, having a section of ten-by-ten (10×10)mm and a length of 50 mm as well as a corded packing material, made from the same EPDM rubber material, having a diameter of 5 mm and a length of 300 mm were used as packing materials according to Comparative Example 6.

Physicality evaluations of the compositions according to the above examples and comparative examples were conducted using the following method.

In order to evaluate compression sets at a high temperature, each of the compositions according to Examples 1–4 and Comparative Examples 1–5 was first cut into a cake of 10 mm in thickness, 10 mm in width and 50 mm in length. As to the packing material according to Comparative Example 6, the EPDM rubber having a section of ten-by-ten (10×10)mm and a length of 50 mm was used as it was. Each specimen obtained in this manner was laid still for 5 days in a thermostat, where the temperature was controlled at 80° C., while being compressed in its thickness direction to be 50%, i.e., 5 mm in thickness. After 5 days had passed, each specimen was taken out of the thermostat, released from the compressive force, and cooled to room temperature. When each specimen was cooled, the thickness thereof was measured to calculate a compression set. The results of calculation are given in Table 1.

The compression sets were calculated on the basis of the following formula:

$$\text{Compression Set}(\%) = \left[1 - \frac{(T_1 - 0.5 \times T_0)}{(0.5 \times T_0)}\right] \times 100 \qquad \text{[Formula 1]}$$

$T_0$=initial thickness of each specimen
$T_1$=thickness of each specimen measured after compression for 5 days under 80° C.

The assembly of two members using each of the aforementioned compositions was performed in the following manner.

First of all, a steel plate 1, which was 1,000 mm in length, 500 mm in width, and 2 mm in thickness, was prepared, with an end of a width side of 500 mm bent in L shape by 5 mm. Also, another steel plate 2, which was 40 mm in length, 500 mm in width, and 2 mm in thickness, was prepared. Then, in order to join a width side of 500 mm of the steel plate 2 to the bent portion of the steel plate 1, various hot melt compositions were used. Specifically, the hot melt compositions according to Examples 1–4 and Comparative Examples 1–2, and 4–5 were melted to be in a certain range of temperatures, where melt viscosity of each composition is from 10 to 500 pa.s, and previously applied to an inner side of the bent portion of the steel plate 1 to a thickness of 4 mm and a width of 50 mm, using the "Bulk Melter BM505," an applicator from Nordson Company. The width side of the steel plate 2 was then superimposed over the composition applied to the steel plate 1. Once the composition was cooled and solidified, the steel plate 1 was united with the steel plate 2, and an L-shaped building component was thus produced.

Now, for a water leak test, a weir, 50 mm in height, was formed out of a silicone resin sealing material in a region on the inner side of the steel plate 1 facing the steel plate 2, the region containing a connected portion between the steel plates 1 and 2 of the L-shaped building component. Then, the weir was injected with water and left in this state for 10 days. The results of this water leak test are given in Table 1.

Also, for evaluation of peelability of each composition, the L-shaped building component was disassembled into the original two steel plates, thereby determining whether or not it was easy to disassemble the members once joined with the compositions. The results of this peelability test are also given in Table 1.

Evaluation methods for each test were as follows:
(1) Water Leak Test

A weir having a height of 50 mm was formed out of a silicone resin sealing material in a region on the inner sides of two steel plates, where the two steel plates faced each other, containing a connected portion between the two plates. The weir was injected with water, and left in this state. After 10 days had passed, it was observed whether or not any water leak had occurred through the connected portion of the two plates.

(2) Peelability Test

A slotted screwdriver was inserted into the connected portion to see whether or not the two steel plates were easily detachable from each other.

As seen from the test results shown in Table 1, the compression set of none of the compositions according to Examples 1–4 reaches 100%, which means that these compositions are capable of recovering even after being subjected to a compressive stress under a high temperature, unlike those according to Comparative Examples 1–6. Accordingly, the compositions according to Examples 1–4 can follow the motion of the sealed portions and maintain their sealing properties. In addition, the compositions according to Examples 1–4 are advantageous from an aspect of the peelability as well. For, they can be easily peeled off, and therefore, the members joined with these compositions can be separated from each other, which enables recycling of used members.

Also, automatic application of the compositions according to Examples 1–4 is possible, since they are hot melt-type sealing materials. After being automatically applied, the hot melt-type compositions are cooled and solidified, and upon solidification, an expected performance of each composition can be achieved. Furthermore, the compositions according to Examples 1–4 can be applied in advance of the assembling work. If any of the compositions is previously applied to one of two members to be assembled, all a worker needs to do during a subsequent process or at a construction site is to set the two members in place and join them up. In view of these advantages, compared to cases where a plurality of members are assembled by use of a conventional reactive curing sealing material or previously molded packing material, productivity is highly improved in cases where the hot melt-type compositions according to the invention are used for assembling two or more members.

TABLE 1

RESULTS OF VARIOUS TESTS

| ITEMS | EX. 1 | EX. 2 | EX. 3 | EX. 4 |
|---|---|---|---|---|
| [COMPONENTS] | | | | |
| KRATON G1650 | 3 | 50 | 9.5 | 7 |
| KRATON G1657 | 20 | — | — | 20 |
| XYRON 500H | 30 | 5 | 0.5 | 10 |
| KRISTOL 70 | 15 | — | 90 | 5 |
| UBETAC UT2304 | — | 45 | — | — |
| ARKON P125 | 32 | — | — | 58 |
| MELT VISCOSITY (Pa.s/200° C.) | 240 | 500 | 100 | 150 |
| HARDNESS (JIS A HARDNESS METER/23° C.) | 10 | 35 | 5 | 40 |
| COMPRESSION SET (%) | 70 | 40 | 50 | 80 |
| WATER LEAK (+/−) | (−) | (−) | (−) | (−) |
| PEELABILITY (EASY/DIFFICULT) | Easy | Easy | Easy | Easy |

| ITEMS | COMP. EX. 1 | COMP. EX. 2 | COMP. EX. 3 | COMP. EX. 4 | COMP. EX. 5 | COMP. EX. 6 |
|---|---|---|---|---|---|---|
| [COMPONENTS] | | | | | | |
| KRATON G1650 | 2 | 40 | 55 | 4 | 5 | |
| KRATON G1657 | 23 | — | — | — | 20 | |
| XYRON 500H | 32 | 0.2 | 5 | 1 | 10 | |
| KRISTOL 70 | 15 | — | — | 95 | 3 | |
| UBETAC UT2304 | — | 55 | 40 | — | — | |
| ARKON P125 | 28 | 4.8 | — | — | 62 | |
| MELT VISCOSITY (Pa.s/200° C.) | 180 | 300 | Immeasurable | 50 | 100 | — |
| HARDNESS (JIS A HARDNESS METER/23° C.) | 10 | 35 | — | 2 | 50 | 10 |
| COMPRESSION SET (%) | 100 | 100 | — | 100 | 100 | 100 |
| WATER LEAK (+/−) | (+) | (+) | — | (+) | (+) | (+) |
| PEELABILITY (EASY/DIFFICULT) | Difficult | Difficult | — | Difficult | Difficult | Easy |

What is claimed is:

1. A hot melt sealing composition, without any tackifier, consisting essentially of:
   a high-molecular weight styrene block copolymer having a number average molecular weight (Mn) of 100,000 or more;
   one of a polyphenylene ether resin and a modified polyphenylene ether resin having one of a thermal deformation temperature and a glass transition temperature of 120° C. or above; and
   a viscosity adjuster;
   the hot melt sealing composition having a compression set of 50% or less after being compressed for 5 days at a temperature of 80° C. when measured by a measuring method in accordance with provisions of JISK6262.

2. The hot melt sealing composition according to claim 1, wherein:
   the compounding ratio of the high-molecular weight styrene block copolymer is from 3 to 50 parts by weight;
   the compounding ratio of the one of a polyphenylene ether resin and a modified polyphenylene ether resin is from 0.5 to 30 parts by weight; and
   the compounding ratio of the viscosity adjuster is from 5 to 90 parts by weight.

3. The hot melt sealing composition of claim 1 wherein the high-molecular weight styrene block copolymer is one of a styrene-ethylene-1-butene-styrene block copolymer and a styrene-ethylene-propylene-styrene block copolymer.

4. A method of assembling members using a hot melt sealing composition, without any tackifier, comprising the steps of:
   melting a hot melt composition consisting essentially of a high-molecular weight styrene bock copolymer having a average molecular weight (Mn) of 100,000 or more, one of a polyphenylene ether resin and a modified polyphenylene ether resin having one of a thermal deformation temperature and a glass transition temperature of 120° C. or above, and a viscosity adjuster, wherein the hot melt composition provides a hot melt sealing composition has a compression set of 50% or less after being compressed for 5 days at a temperature of 80° C. when measured in accordance with JISK6262 and an enhanced disassembly property;
   applying the hot melt sealing composition to a connecting part of one member in advance of a time of assembling work; and
   joining the connecting part of the one member to a connecting part of another member at the time of the assembling work, wherein
      the connecting part of the one member and the connecting part of the other member are subsequently readily separable due to the enhanced disassembly property.

5. The method of assembling members according to claim 4, wherein:
   the compounding ratio of the high-molecular weight styrene block copolymer is from 3 to 50 parts by weight;
   the compounding ratio of the one of a polyphenylene ether resin and a modified polyphenylene ether resin is from 0.5 to 30 parts by weight; and
   the compounding ratio of the viscosity adjuster is from 5 to 90 parts by weight.

6. The method of assembling members as set forth in claim 4 wherein the high-molecular weight block copolymer is one of a styrene-ethylene-1-butene-styrene block copolymer and a styrene-ethylene-propylene-styrene block copolymer.

7. A hot melt sealing composition, without any tackifier, consisting essentially of:
   a high-molecular weight styrene block copolymer having an average molecular weight (Mn) of 100,000 or more;
   one of a polyphenylene ether resin and a modified polyphenylene ether resin, having a thermal deformation temperature or glass transition temperature of 120° C. or above; and
   a viscosity adjuster;
   wherein the hot melt sealing composition has:
      a compression set of 50% or less after being compressed for 5 days a at a temperature of 80° C. when measured in accordance with JISK6262,
      an adhesive property sufficient for using the hot melt sealing composition as a sealing composition, and,
      an enhanced disassembly property.

8. The hot melt sealing composition of claim 7 wherein the high-molecular weight styrene block copolymer is one of a styrene-ethylene-1-butene-styrene block copolymer and a styrene-ethylene-propylene-styrene block copolymer.

9. A method of assembling members using a hot melt sealing composition, without any tackifier, comprising the steps of:
   melting a hot melt sealing composition consisting essentially of a high molecular weight styrene block copolymer having a average molecular weight (Mn) of 100,000 or more, one of a polyphenylene ether resin and a modified polyphenylene ether resin having one of a thermal deformation temperature and glass transition temperature of 120° C. or above, and a viscosity adjuster, wherein the hot melt composition has a compression set of 50% or less after being compressed for 5 days at a temperature of 80° C. when measured in accordance with JISK6262, an adhesive property sufficient for using the hot melt sealing composition as a sealing composition, and an enhanced disassembly property;
   applying the hot melt sealing composition to a connecting part of one member in advance of a time of assembling work; and
   joining the connecting part of the one member to a connecting part of another member at the time of the assembling work;
   wherein the connecting part of the one member and the connecting part of the other member are subsequently readily separable due to the enhanced disassembly property.

10. The method of assembling members as set forth in claim 9 wherein the high-molecular weight block copolymer is one of a styrene-ethylene-1-butene-styrene block copolymer and a styrene-ethylene-propylene-styrene block copolymer.

* * * * *